(12) United States Patent
Duvall, Jr.

(10) Patent No.: US 6,588,822 B1
(45) Date of Patent: Jul. 8, 2003

(54) TAILGATE SEAT APPARATUS (76) Inventor: George Parker Duvall, Jr., 1164 Rineyville - Big Springs Rd., Rineyville, KY (US) 40162

( * ) Notice: Subject to any disclaimer, the term of this patent is extended or adjusted under 35 U.S.C. 154(b) by 0 days.

(21) Appl. No.: 10/242,101

(22) Filed: Sep. 12, 2002

(51) Int. Cl.[7] .............................................. B62D 33/03
(52) U.S. Cl. ...................... 296/57.1; 296/66; 296/65.16
(58) Field of Search .......................... 296/57.1, 51, 63, 296/66, 65.15

(56) References Cited

U.S. PATENT DOCUMENTS

| | | |
|---|---|---|
| 5,000,504 A | 3/1991 | Munguia |
| 5,215,346 A | 6/1993 | Reitzloff et al. |
| D368,809 S | 4/1996 | Fields |
| 5,971,464 A | 10/1999 | Davis et al. |
| 6,116,676 A | 9/2000 | Edwards |
| 6,203,108 B1 | 3/2001 | Mattison, Jr. |
| 6,227,594 B1 * | 5/2001 | Pommeret .................. 296/57.1 |
| 6,273,504 B1 | 8/2001 | Pace et al. |
| 6,286,885 B1 | 9/2001 | Ramos |
| 6,364,391 B1 * | 4/2002 | Everett ........................ 296/51 |
| 2002/0109369 A1 * | 8/2002 | Booomhower et al. ....... 296/63 |

* cited by examiner

*Primary Examiner*—Joseph D. Pape
(74) *Attorney, Agent, or Firm*—Dale J. Ream (57) ABSTRACT

A tailgate seat apparatus includes a tailgate frame pivotally mounted to a pickup truck for movement between upright and open configurations. A top surface of the tailgate frame defines a seat recess for supporting a person in a seated position. A seat back is pivotally mounted to an inner edge of the tailgate frame for movement between an upright support configuration and a stowage configuration, the back support being nested in the seat recess at the stowage configuration for conventional tailgate use. Armrests are mounted to a front surface of the back support and may be selectively pivoted into front surface channels. The apparatus includes beverage holders and storage compartments.

17 Claims, 11 Drawing Sheets

TAILGATE SEAT APPARATUS

BACKGROUND OF THE INVENTION

This invention relates generally to recreational seat assemblies and, more particularly, to a tailgate seat apparatus for use on a pickup truck that may be used for seating or for conventional tailgate use.

Pickup trucks and other vehicles having tailgates are frequently used for activities other than hauling cargo, such as for recreational activities. More particularly, tailgate is often moved to an open position and used as a seat. However, a conventional tailgate is uncomfortable to sit on for an extended period of time and lacks features that are convenient for picnic or sporting event "tailgating" activities.

Various devices have been proposed for making a tailgate more comfortable, such as cushions or backrests. Although assumably effective for their intended purposes, the existing devices do not provide one or more seats that conform to a person's body and that are also selectively collapsible into a planar storage configuration so that the tailgate may selectively serve its conventional cargo loading/hauling purpose.

Therefore, it is desirable to have a tailgate seat apparatus that provides at least one seat that is pivotally adjustable between a seating position and a planar stowage position. Further, it is desirable to have a tailgate seat apparatus that provides at least one seat that is contoured to comfortably receive and support a seated person. In addition, it is desirable to have a tailgate seat apparatus that includes armrests, beverage holders, and utility compartments for picnic activity convenience.

SUMMARY OF THE INVENTION

A tailgate seat apparatus according to the present invention includes a tailgate frame that may be pivotally mounted to the body of a pickup truck in replacement of a conventional tailgate. The tailgate frame includes a top surface that defines a seat recess that is contoured to comfortably receive a person in a seated position thereon. A rigid back support is pivotally coupled to an inner wall of the tailgate frame in alignment with the seat recess. The back support is movable between an upright configuration for supporting a person's back when seated upon the seat recess and a closed or stowage configuration nested in the seat recess such that a rear surface of the back support is even with a horizontal plane established by the top surface of the tailgate frame. Of course, the tailgate seat apparatus may alternatively include two or more seat recesses and corresponding back supports in side-by-side relation or the seat recess and back support may have a bench configuration. In addition, each seat back includes a pair of pivotal armrests having means for holding beverage containers or the like. In another embodiment, the seating apparatus is removably coupled to a conventional tailgate.

Therefore, a general object of this invention is to provide a tailgate seat apparatus which provides comfortable seating to a person when the tailgate is in an open/down configuration.

Another object of this invention is to provide a tailgate seat apparatus, as aforesaid, which may be selectively utilized for seating or as a conventional tailgate.

Still another object of this invention is to provide a tailgate seat apparatus, as aforesaid, having a seat back support that is pivotal between an upright support position and a folded down stowage position.

Yet another object of this invention is to provide a tailgate seat apparatus, as aforesaid, having pivotal armrests with beverage container holders.

A further object of this invention is to provide a tailgate seat apparatus, as aforesaid, that may be removably coupled to a conventional tailgate.

Other objects and advantages of this invention will become apparent from the following description taken in connection with the accompanying drawings, wherein is set forth by way of illustration and example, embodiments of this invention.

DESCRIPTION OF THE PREFERRED EMBODIMENT

Figure 1:
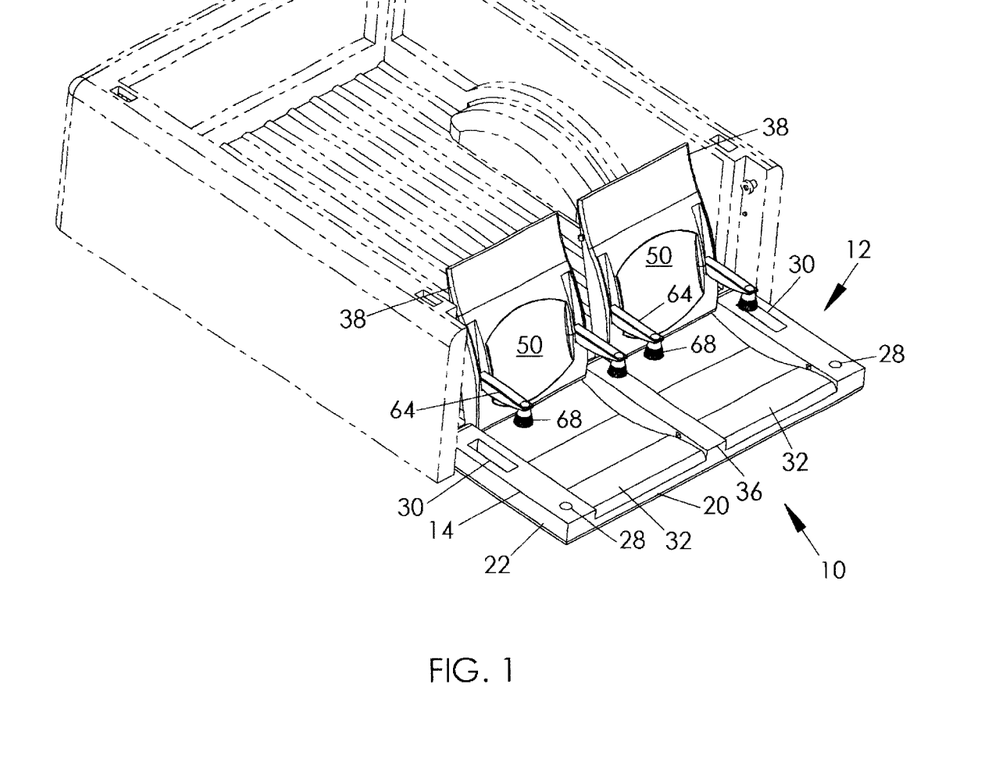
FIG. 1 is a perspective view of a tailgate seat assembly according to one embodiment of the present invention in use on a pickup truck.
Figure 2:
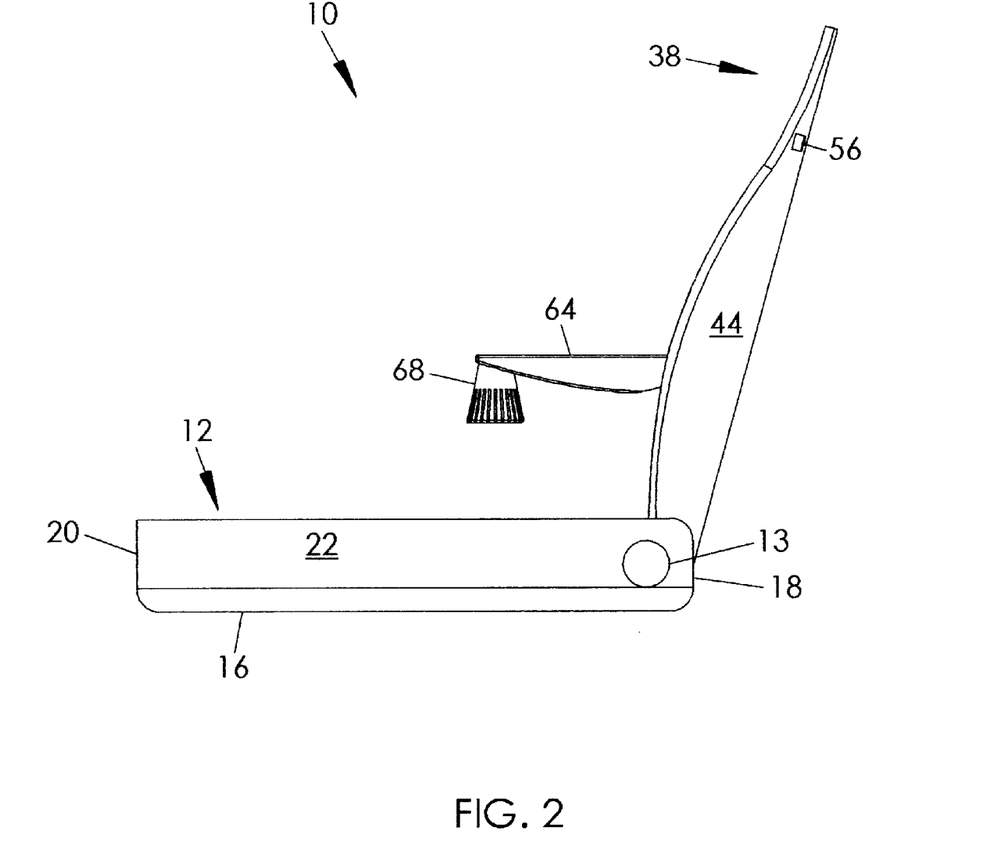
FIG. 2 is a side view of the apparatus as in FIG. 1 removed from the pickup truck.
Figure 3:
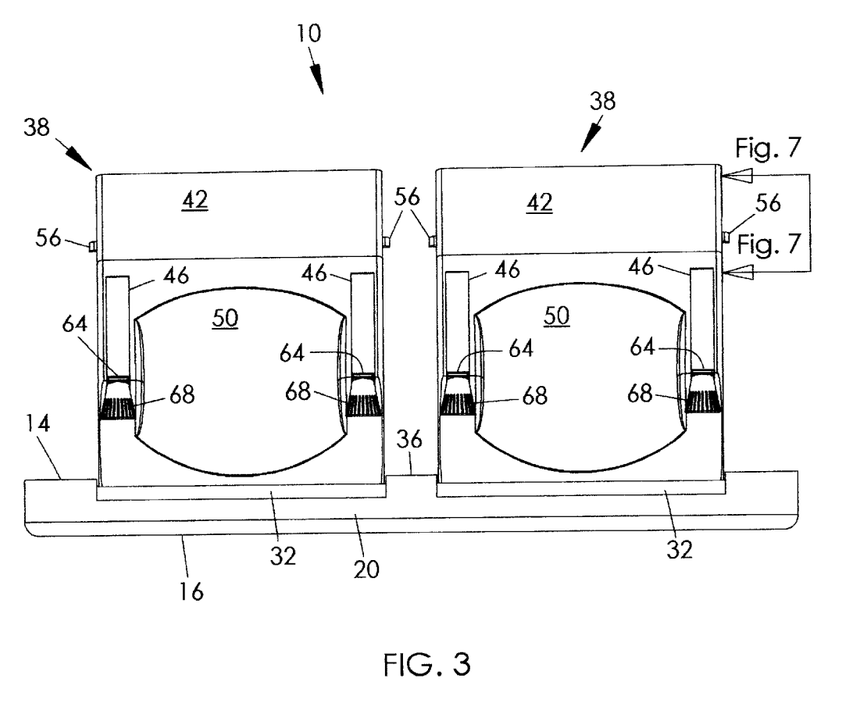
FIG. 3 is a front view of the apparatus as in FIG. 1.
Figure 4:
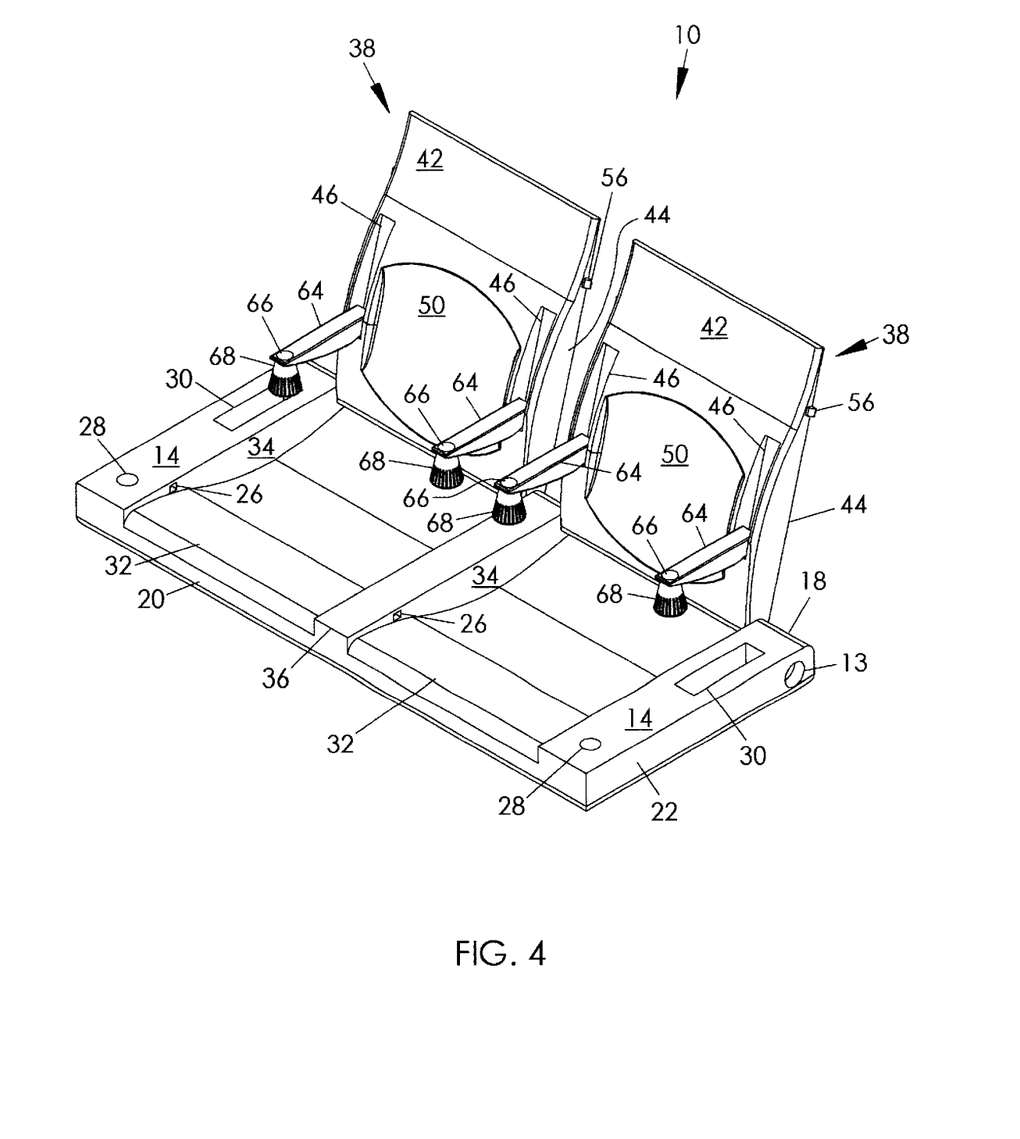
FIG. 4 is another perspective view of the apparatus as in FIG. 1 removed from the pickup truck and with the armrests in an open configuration.

A tailgate seat apparatus according to the present invention will now be described in detail with reference to FIGS. 1 through 11 of the accompanying drawings. A tailgate seat apparatus 10 according to a now preferred embodiment includes a tailgate frame 12 having a generally rectangular configuration. More particularly, the tailgate frame 12 includes top 14 and bottom 16 sides each defining a planar surface. Inner 18 and outer 20 walls extend longitudinally along the top 14 and bottom 16 surfaces with opposed side walls 22 extending between ends of the inner 18 and outer 20 walls (FIG. 4). Connection points 13 on respective side walls 22 adjacent the inner wall 18 (FIG. 2) enable the tailgate frame 12 to be pivotally coupled to the rear of the body frame of a pickup truck in a conventional manner. Therefore, the tailgate frame 12 may be pivotally moved relative to the pickup truck between an upright closed configuration (not shown) and a generally horizontal open configuration (FIG. 1). At the open tailgate configuration, the top surface 14 of the tailgate frame 12 defines a generally horizontal plane.

The top surface 14 of the tailgate frame 12 defines a pair of spaced apart seat recesses 32 (FIG. 4) although more or fewer seat recesses may be defined as to be described later.

Each seat recess 32 has a configuration ergonomically contoured to comfortably receive and support a person in a seated position therein. Each seat recess 32 is bounded by seat recess side walls 34. As the seat recesses 32 are preferably spaced apart, the top surface 14 of the tailgate frame 12 forms a ledge 36 or console therebetween useful for supporting articles such as beverage containers or the like. It is understood that each seat recess 32 may include a layer of padded material or a cushion (not shown).

The tailgate seat apparatus 10 further includes a pair of back supports 38 (FIG. 4).

Figure 6:
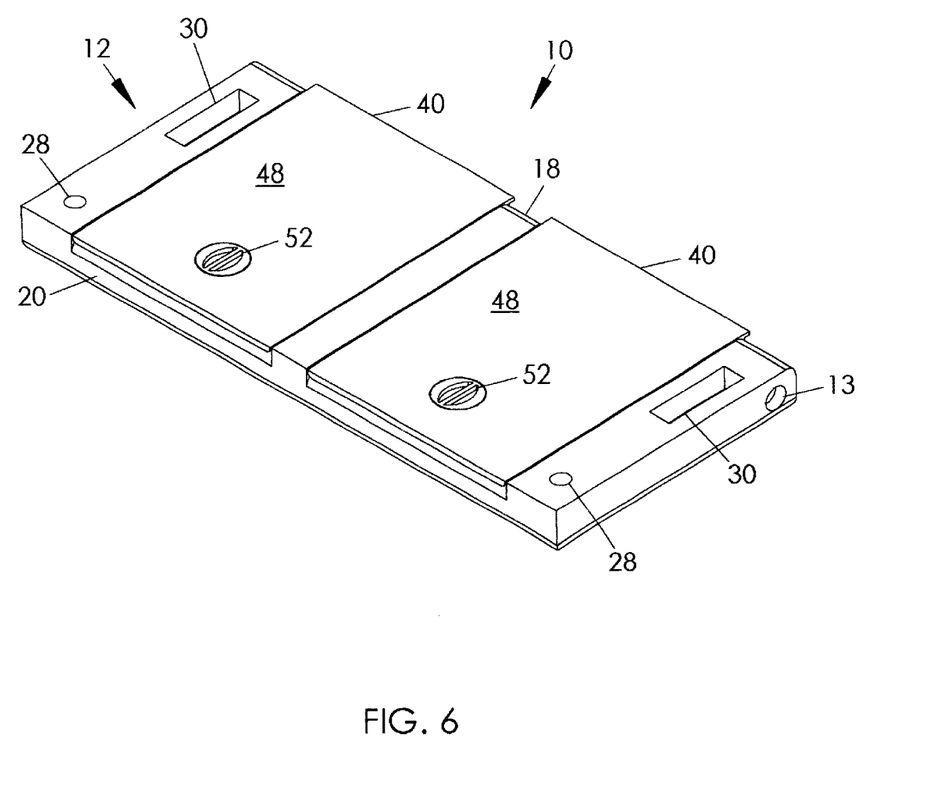
FIG. 6 is a perspective view of the apparatus as in FIG. 4 with the back supports in stowage configurations.

Each back support 38 includes a generally rectangular configuration and is constructed of a generally rigid material. Each back support 38 is pivotally coupled adjacent its lower edge 40 to the inner wall 18 of the tailgate frame 12. Each back support 38 is mounted to correspond with a respective seat recess 32. Therefore, each back support 38 may be moved between an upright configuration (FIG. 4) for supporting the back of a person seated in a corresponding seat recess and a stowage configuration (FIG. 6). The lower edge 40 of each back support 38 also forms a stop that effectively holds the back support in the upright configuration, i.e. prevents a back support 38 from laying all the way back.

A front surface 42 of each back support 38 includes a configuration complementary to a configuration of a corresponding seat recess 32 such that the back support 38 may be nested within the corresponding seat recess 32 when pivoted to the stowage configuration. This nesting configuration results in the rear surface 48 of each back support 38 laying even with the horizontal plane of the top surface 14 of the tailgate frame 12. In the stowage configuration, therefore, the tailgate frame 12 may be utilized as a conventional tailgate, such as for loading or hauling cargo. In addition, the front surface 42 of each back support 38 includes a portion 50 having a convex configuration complementary to the shape of a person's back who is seated on a corresponding seat recess.

Figure 7:
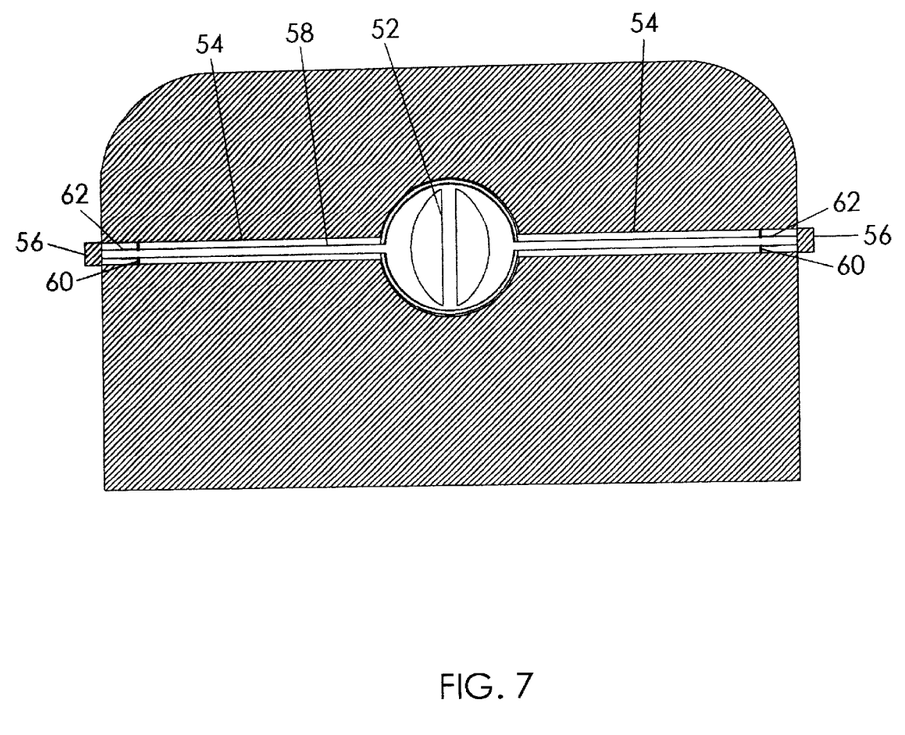
FIG. 7 is a sectional view taken along line 7—7 of FIG. 3.

Each back support 38 may be selectively locked or released from the stowage configuration. More particularly, a latch handle 52 is mounted to the rear surface 48 of each back support 38 and is preferably recessed therein (FIG. 6). Each latch handle 52 is mounted for rotational movement. Each back support 38 defines a bore 54 extending through the interior thereof between the latch handle recess and opposed side edges 44 of the back support 38 (FIG. 7). A spring-loaded flange 56 is positioned within the bore 54 at each opposed side edge 44, each spring-loaded flange being configured to normally extend outwardly from a corresponding side edge 44. Each spring-loaded flange 56 is coupled to a respective latch-handle 52 with a wire 58 or the like. Spring retainers 60 are positioned within each bore 54 adjacent each spring-loaded flange 56 for retaining a corresponding spring 62 thereof A rotation of a latch handle 52 by a user draws respective spring-loaded flanges 56 into a respective bore 54, thereby compressing respective springs 62.

Each side wall 34 bordering a respective seat recess 32 defines a hole 26 displaced from the outer wall 20 of the tailgate frame 12 (FIG. 4). Each hole 26 includes a configuration complementary to a configuration of a corresponding spring-loaded flange 56. Therefore, the spring-loaded flanges 56 of a back support 38 may be drawn into a respective bore 54 by an operation of a corresponding latch handle 52 so that the flanges 56 may be aligned with corresponding holes 26 at the stowage configuration. A release of the latch handle 52 then allows the spring-loaded flanges 56 to move outwardly so as to lock the back support 38 in the stowage configuration (FIG. 6).

A pair of armrests 64 are pivotally coupled to the front surface 42 of each back support 38. Each armrest 64 is pivotally movable between an upright storage configuration (FIG. 5) and a generally horizontal use configuration (FIG. 4). Each armrest 64 defines a circular aperture 66 adjacent a distal end relative to the front surface 42 of a corresponding back support 38. A net 68 is attached to a bottom side of each armrest 64 surrounding each aperture 66 for capturing and holding a beverage container or the like which may be inserted into the aperture 66. It is understood that while a net is preferred because it is collapsible and does not prevent a back support 38 from being placed in its stowage configuration, other small containment structures may also be suitable.

Figure 5:
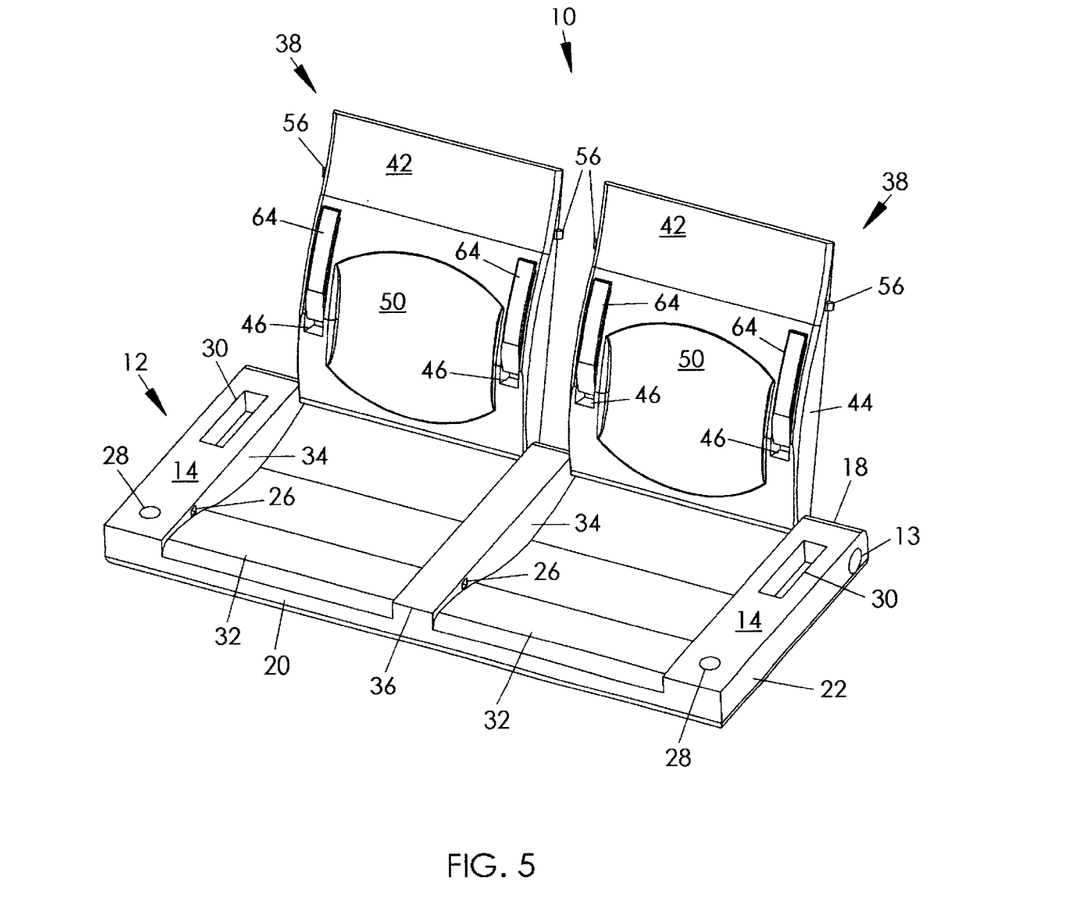
FIG. 5 is a perspective view of the apparatus as in FIG. 4 with the armrests in a closed configuration.

The portion 50 of each front surface 42 that presents a convex construction defines a pair of channels 46, each channel having a configuration suitable for receiving a corresponding armrest 64 in its upright configuration (FIGS. 4 and 5). Therefore, the front surface 42 of each back support 38 presents a smooth surface when the armrests 64 are not in use. This also enables the back supports 38 to nest completely in corresponding seat recesses 32 (FIG. 6).

Further, the top surface 14 of the tailgate frame 12 defines a pair of spaced apart bores 28, each bore being configured to receive and support a fishing rod. Therefore, the present invention is useful as a comfortable seating arrangement for use while fishing. In addition, the top surface 14 of the tailgate frame 12 also defines a pair of spaced apart cavities 30, each cavity being configured to store miscellaneous articles, such as fishing tackle, picnic supplies, or the like.

In use, the conventional tailgate of a pickup truck may be removed and the tailgate frame 12 of the present invention mounted in its place. The back supports 38 may be left in their stowage configurations (FIG. 6) in order to continue using the tailgate frame 12 in to a conventional tailgate manner. Or, respective latch handles 52 may be operated to release the back supports 38 to pivot to upright use configurations (FIG. 4). The armrests 64 may be pivoted to their horizontal use configurations (FIG. 4) or stored in upright configurations (FIG. 5). Beverages may be placed in respective beverage holding apertures 66 and contained therein by corresponding nets 68. When a picnic or fishing activity is over, the back supports 38 may be returned to their stowage configurations, again using the latch handles 52. Finally, the entire tailgate frame 12 may be moved to an upright closed configuration and used as a conventional tailgate.

Figure 8:
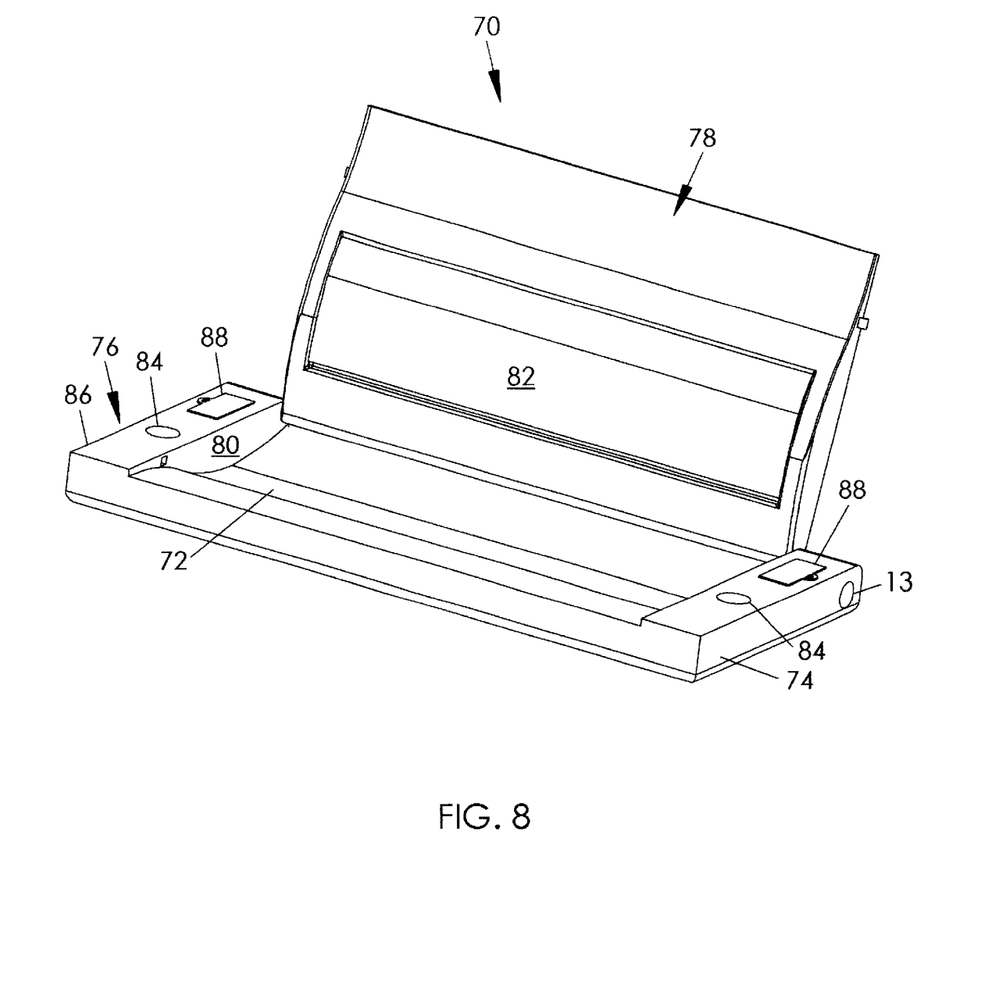
FIG. 8 is a perspective view of a tailgate seat apparatus according to another embodiment of the present invention.

A tailgate seat apparatus 70 according to another embodiment of the present invention is shown in FIG. 8 and includes a construction substantially similar to the construction previously described except as specifically noted below. More particularly, the tailgate seat apparatus 70 according to this embodiment includes a bench seat arrangement in which a single seat recess 72 extends substantially the entire longitudinal distance between opposed side walls 74 of a tailgate frame 76. Further, a single back support 78 extends substantially between side walls 80 of the seat recess 80. The back support 78 is pivotal in the same manner previously described. In addition, a cushion 82 may be mounted to a front surface of the back support 78 for added comfort. Cup holder bores 84 are defined by a top surface 86 of the tailgate frame 76. The top surface 86 may also include ashtrays 88 embedded therein.

Figure 9:
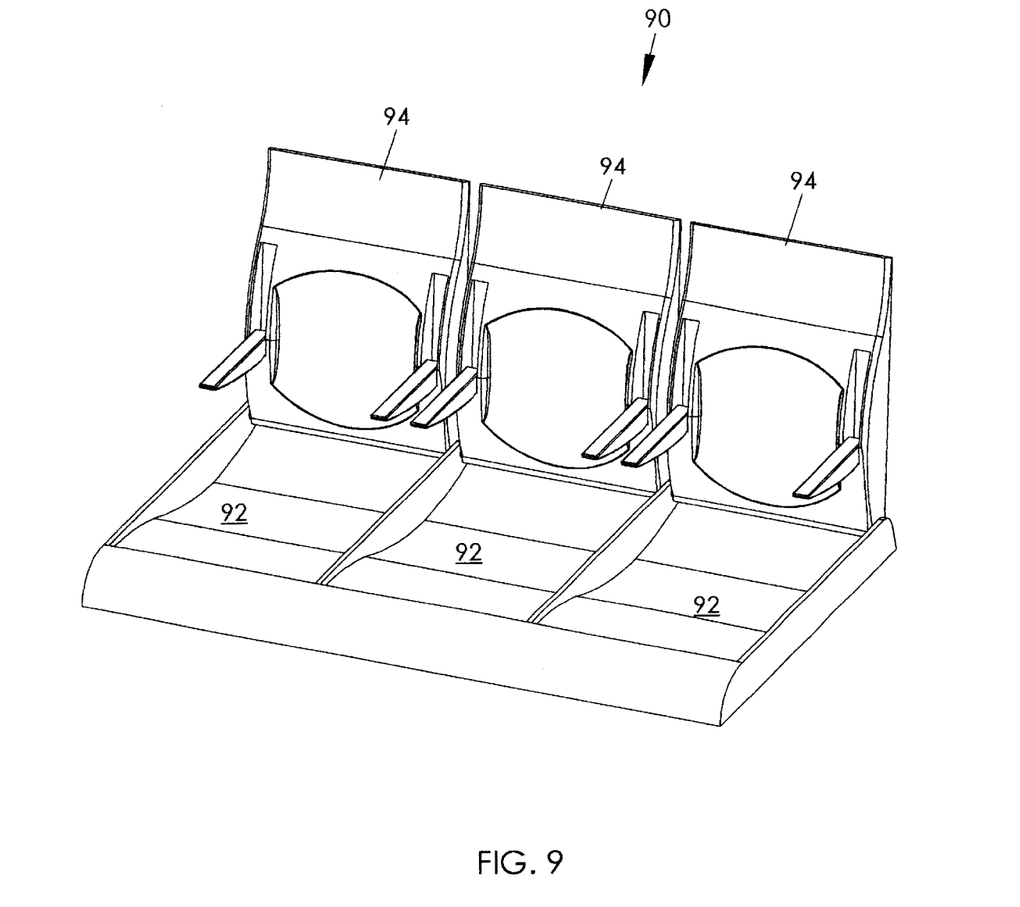
FIG. 9 is a perspective view of a tailgate seat apparatus according to still another embodiment of the present invention.

A tailgate seat apparatus 90 according to still another embodiment of the present invention is shown in FIG. 9 and includes a construction substantially similar to the construction first described above except as specifically noted below. More particularly, the tailgate seat apparatus 90 according to this embodiment includes three seat recesses 92 and corresponding back supports 94 arranged in side-by-side relation. This embodiment is illustrative that the tailgate seat apparatus 90 may include more or fewer seats than the pair of seats described in the embodiment first described.

Figure 10:
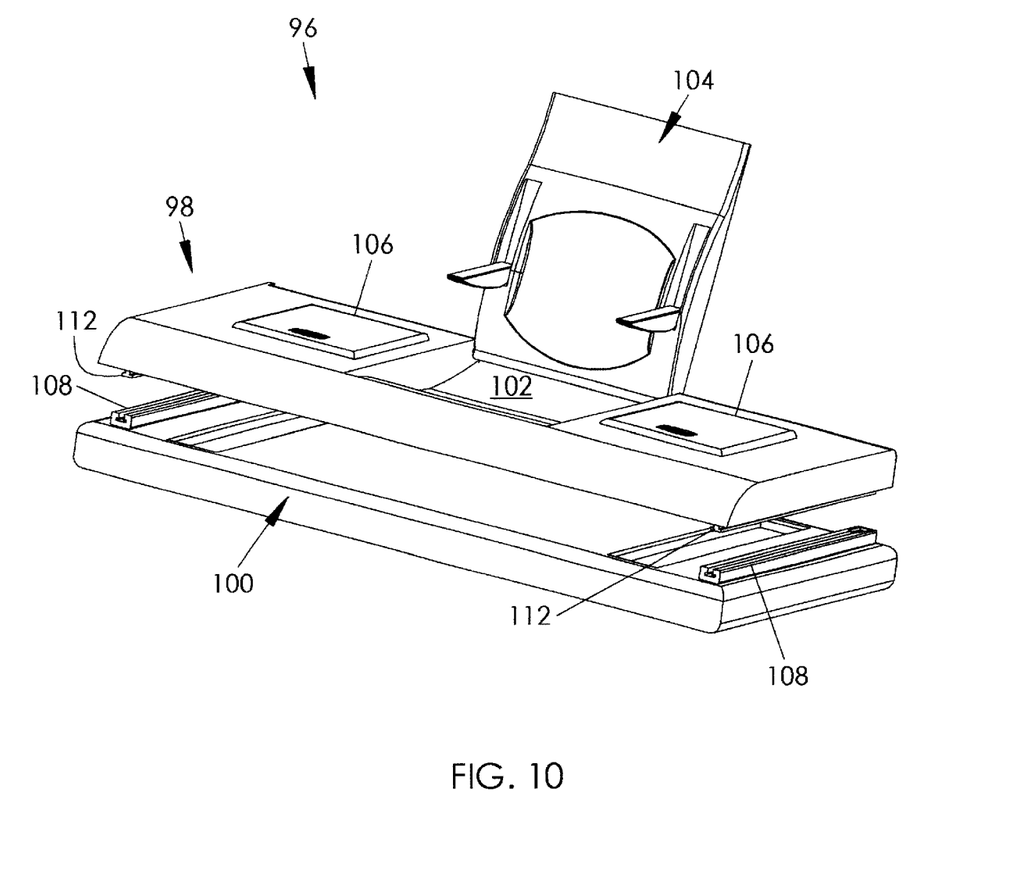
FIG. 10 is a perspective view of a tailgate seat apparatus according to yet another embodiment of the present invention.
Figure 11:
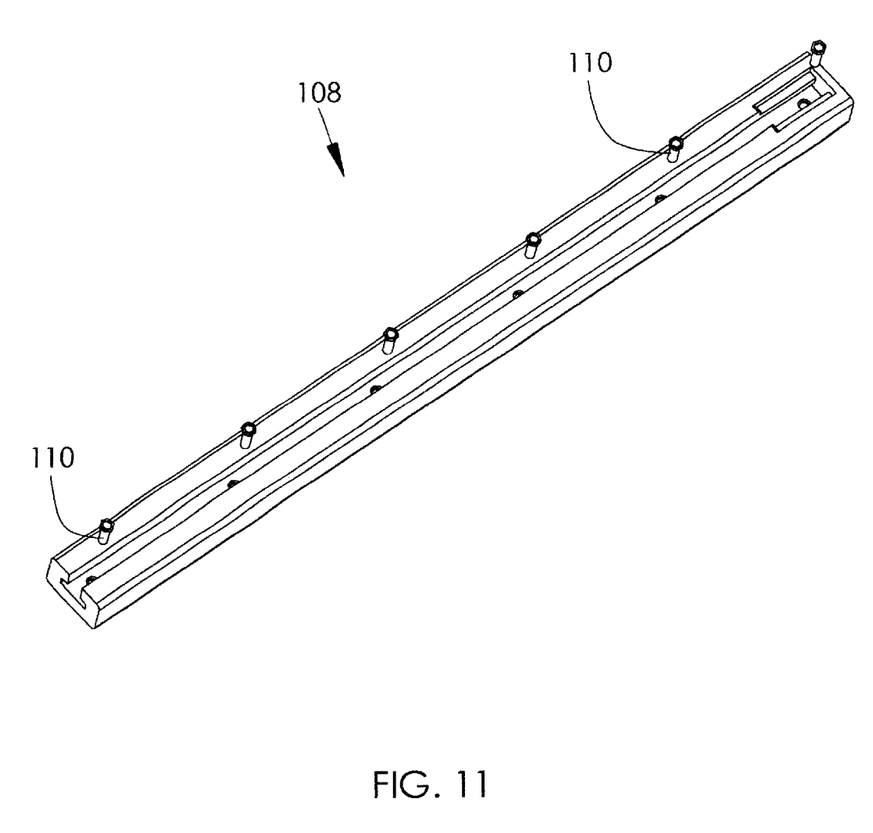
FIG. 11 is an exploded view of a female receptacle as in FIG. 10 on an enlarged scale.

A tailgate seat apparatus 96 according to yet another embodiment of the present invention is shown in FIGS. 10 and 11 and includes a construction substantially similar to the construction previously described except as specifically noted below. More particularly, the tailgate seat apparatus 96 according to this embodiment includes a tailgate frame 98 that is removably mountable to a conventional tailgate 100 (FIG. 10). Although FIG. 10 shows only one seat recess 102 with corresponding pivotal back support 104, it is understood that a multiple seat arrangement or even a bench seat arrangement would also be suitable. In the single seat arrangement, at least one compartment is defined by the tailgate frame 98 and is covered by a compartment lid 106. The tailgate frame 98 is releasably coupled to the conventional tailgate 100 with a runner assembly. More particularly, a pair of receptacle tracks 108 having female configurations may be mounted to a top surface of the conventional tailgate 100 with self tapping screws 110 or the like (FIG. 11). A pair of attachment tracks 112 having male configurations are mounted to a bottom surface of the tailgate frame 98 such that the tailgate frame 98 may be slidably coupled to the tailgate 100, the tracks having a locking configuration. Of course, the tracks may be configured for a snap-fit engagement. It is also understood that the receptacle tracks 108 may alternatively be mounted to the tailgate frame 98 while the attachment tracks 112 may be mounted to the tailgate 100. Further, the tracks may be recessed into the bottom surface of the tailgate frame 98 so that the tailgate frame 98 and tailgate 100 fit in flush engagement.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A tailgate seat apparatus for use on a pickup truck, comprising:
   a tailgate frame pivotally mounted to said pickup truck and movable between an upright closed configuration and a generally horizontal open configuration, said tailgate frame having a top surface defining a horizontal plane and a bottom surface;
   wherein said top surface defines a seat recess having a configuration contoured to receive a person in a seated position;
   a back support having a lower edge pivotally coupled to said tailgate frame and having a planar rear surface, said back support being selectively movable between an upright configuration for supporting said person's back when said person is seated in said seat recess and a stowage configuration in which said back support is nested in said seat recess so that said rear surface is in said horizontal plane; and
   a pair of armrests pivotally coupled to a front surface of said back support, each armrest being movable between an upright storage configuration and a generally horizontal use configuration.

2. The tailgate seat apparatus as in claim 1 further comprising means for releasably locking said back support in said stowage configuration.

3. The tailgate seat apparatus as in claim 2 wherein said tailgate frame defines at least one hole, said at least one hole being positioned along at least one side of said seat recess and adjacent said top surface; said locking means including:
   a latch handle mounted to said rear surface of said back support;
   at least one flange slidably positioned within said back support adjacent a side edge thereof and normally extending outwardly therefrom, said at least one flange being operatively connected to said latch handle for retracting said at least one flange into said back support upon an operation of said latch handle, whereby said back support may be releasably locked in said stowage configuration when said at least one flange is aligned and mated with said at least one hole.

4. The tailgate seat apparatus as in claim 1 wherein said front surface of said back support includes a generally convex configuration contoured to ergonomically receive said person's back when said person is seated on said seat recess, said front surface defining a pair of channels configured to receive said pair of armrests therein when said pair of armrests are in said upright storage configurations.

5. The tailgate seat apparatus as in claim 1 wherein each armrest defines an aperture at a distal end thereof relative to said back support, each armrest including a net coupled to a respective distal end and situated to capture a beverage container inserted into a corresponding aperture.

6. The tailgate seat apparatus as in claim 1 wherein:
   said top surface of said tailgate frame defines at least one bore having a configuration complementary to a configuration of a fishing rod; and
   said top surface of said tailgate frame defines at least one cavity adapted to hold miscellaneous articles therein.

7. The tailgate seat apparatus as in claim 1 wherein:
   said seat recess extends substantially between opposed side walls of said tailgate frame; and
   said back support extends substantially between opposed side edges of said seat recess.

8. The tailgate seat apparatus as in claim 7 further comprising:
   a padded cushion mounted to said front surface of said back support; and
   an ashtray mounted to said top surface of said tailgate frame.

9. A tailgate seat apparatus for use on a pickup truck, comprising:
   a tailgate frame pivotally mounted to said pickup truck and movable between an upright closed configuration and a generally horizontal open configuration, said tailgate frame having inner and outer longitudinally extending walls with opposed side walls extending between said inner and outer walls, said tailgate frame having a top surface defining a horizontal plane and a bottom surface;
   wherein said top surface defines a pair of spaced apart seat recesses, each seat recess having a configuration contoured to support a person in a seated position;
   a pair of spaced apart back supports, each back support having a planar rear surface and a lower edge pivotally coupled to said inner wall of said tailgate frame in alignment with a corresponding seat recess, said each back support being pivotally movable between an upright configuration for supporting said person's back when said person is seated in said corresponding seat recess and a stowage configuration nested in a corresponding seat recess such that a respective rear surface is in said horizontal plane; and a pair of armrests pivotally coupled to a front surface of said each back support, each armrest being movable between an upright storage configuration and a generally horizontal use configuration.

10. The tailgate apparatus as in claim 9 wherein said front surface of said each back support includes a convex configuration that ergonomically mates with said person's back and defines spaced apart channels for receiving respective armrests therein at said upright storage configurations.

11. The tailgate apparatus as in claim 9 further comprising spring means mounted to said each back support for releasably locking said each back support at said stowage configuration.

12. The tailgate apparatus as in claim 9 wherein:

said tailgate frame defines a pair of holes along opposed edges of each seat recess;

said spring means includes:
   a latch handle mounted to said rear surface of said each back support, said each back support defining a bore extending between said latch handle and opposed side edges of said each back support;
   a pair of spring-loaded flanges positioned in each bore adjacent respective opposed side edges of said each back support, each spring-loaded flange normally extending outwardly from a corresponding side edge and being operatively connected to a respective latch handle, each pair of spring-loaded flanges being positioned in alignment with corresponding holes in said tailgate frame at said stowage configuration such that a rotation of said respective latch handle retracts a corresponding pair of spring-loaded flanges into a corresponding bore.

13. The tailgate apparatus as in claim 9 wherein each armrest defines an aperture at a distal end thereof relative to a respective back support, each armrest including a net coupled to a respective distal end and situated to capture a beverage container inserted into a corresponding aperture.

14. The tailgate apparatus as in claim 9 wherein:

said top surface of said tailgate frame defines a bore adjacent each seat recess, each bore having a configuration for receiving a fishing pole; and said top surface of said tailgate frame defines a cavity adjacent each seat recess, each cavity adapted to hold a plurality of articles.

15. A tailgate seat apparatus for use on a pickup truck having a generally rectangular tailgate pivotally mounted to a body of the truck and pivotal between an upright closed configuration and a generally horizontal open configuration, said tailgate seat apparatus, comprising:

a seating frame having a top surface defining a horizontal plane and a bottom surface;

a pair of spaced apart female receptacles mounted to an upper surface of said tailgate;

a pair of spaced apart male attachment structures mounted to said bottom surface of said seating frame and configured for detachably coupling with respective female receptacles for releasably connecting said seating frame to said tailgate;

wherein said top surface of said seating frame defines a seat recess having a configuration contoured to receive a person in a seated position;

a back support having a planar rear surface and a lower edge pivotally coupled to said seating frame in alignment with said seat recess, said back support being selectively movable between an upright configuration for supporting said person's back when said person is seated in said seat recess and a stowage configuration in which said back support is nested in said seat recess and said rear surface is in said horizontal plane; and means for releasably locking said back support in said stowage configuration.

16. The tailgate apparatus as in claim 15 further comprising a pair of armrests pivotally coupled to a front surface of said back support, each armrest being movable between an upright storage configuration and a generally horizontal use configuration.

17. The tailgate apparatus as in claim 16 wherein:

said front surface of said back support includes a generally convex configuration contoured to receive said person's back when said person is seated upon said seat recess, said front surface defining a pair of channels configured to nest respective armrests therein when said pair of armrests are in said upright storage configurations; and each armrest defines an aperture at a distal end thereof relative to said front surface of said back support, each armrest including means connected to a respective distal end for holding a beverage container inserted in a corresponding aperture.

* * * * *